May 26, 1959 D. D. PETTIGREW ET AL 2,887,924
CROSS SLIDE THREADING STOP
Filed Nov. 30, 1955 2 Sheets-Sheet 1
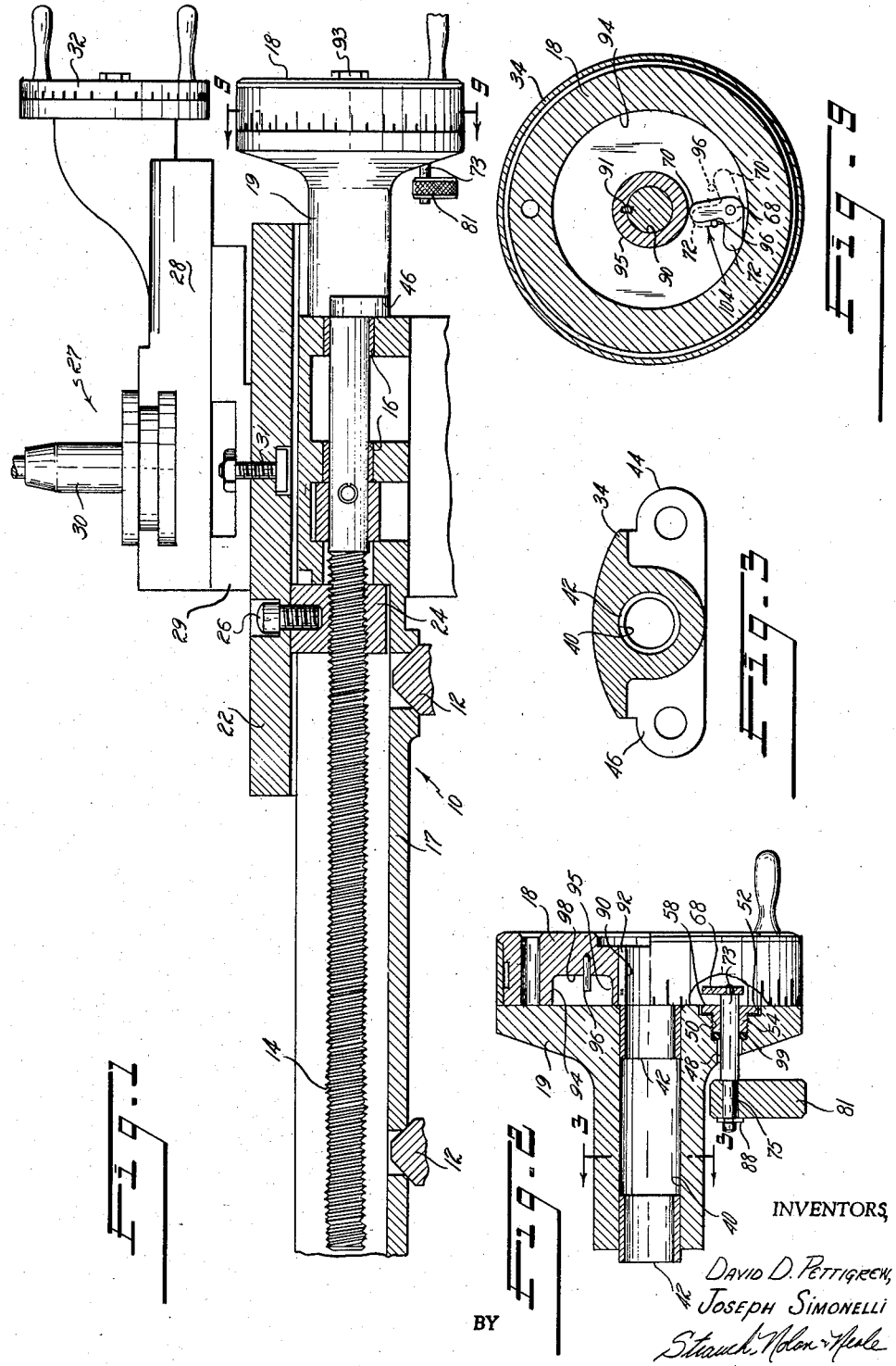
INVENTORS
DAVID D. PETTIGREW,
JOSEPH SIMONELLI
BY
ATTORNEYS May 26, 1959 D. D. PETTIGREW ET AL 2,887,924
CROSS SLIDE THREADING STOP
Filed Nov. 30, 1955 2 Sheets-Sheet 2
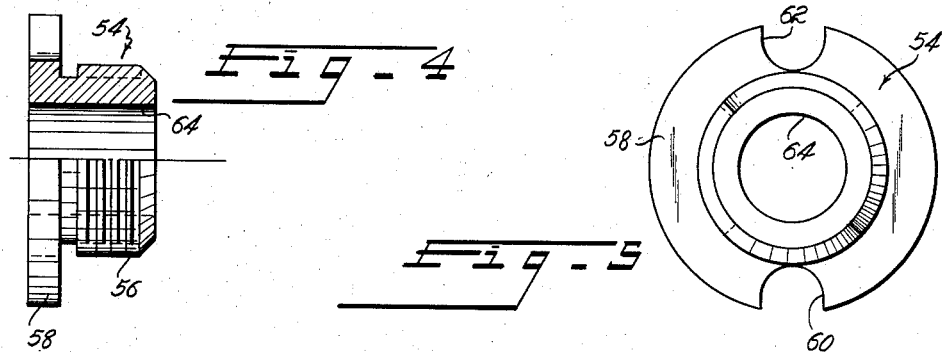
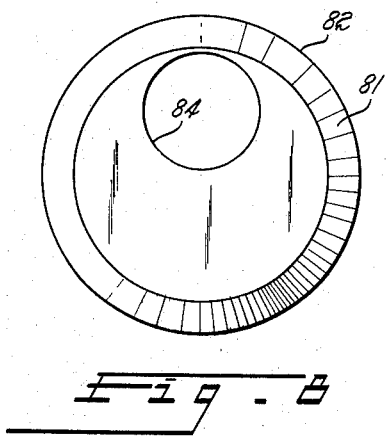
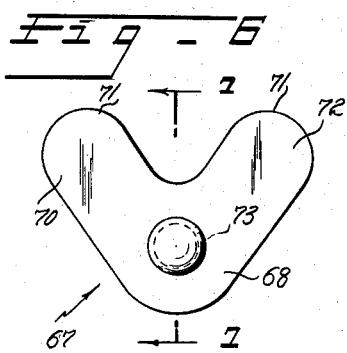
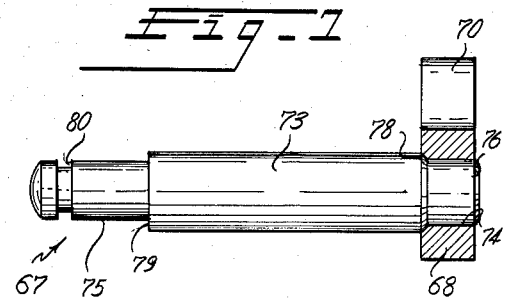
INVENTORS,
DAVID D. PETTIGREW,
JOSEPH SIMONELLI
BY
ATTORNEYS ல் United States Patent Office 2,887,924
Patented May 26, 1959

2,887,924
CROSS SLIDE THREADING STOP

David D. Pettigrew and Joseph Simonelli, Pittsburgh, Pa., assignors to Rockwell Manufacturing Company, Pittsburgh, Pa., a corporation of Pennsylvania Application November 30, 1955, Serial No. 550,142

9 Claims. (Cl. 82—24)

This invention relates to a stop or limit gage for the cross slide of lathes or similar machine tools.

Thread stops or limit gages are commonly used on lathes during certain operations such, for example, as cutting threads, where it is desirable to move the cutting tool a predetermined distance away from the work at the end of each threading cut and to return the tool toward the work the same distance at the beginning of the next cut. The final position of the tool for regulating the depth of cut is determined by means of a separate micrometer screw controlling the movement of the compound feed slide. Mechanisms of this general type are well known and disclosed, for example, in United States Patents 1,721,524 and 1,799,311 to Moore and 2,131,129 to Whitehead.

Thread stops or limit gages heretofore proposed have been made commercially available as an accessory at extra cost to the standard lathe because of their more or less involved construction and relative high cost. Because of the large number of accessories required for full utilization of lathes and the increased cost percentagewise of merchandizing as well as manufacturing accessories, a lathe complete with all of the accessories is much more expensive to purchase than if accessory features could economically be built into and marketed as a part of the standard lathe unit.

It is the primary object of the present invention to provide a thread stop or limit gage which utilizes as many of the conventional parts of a lathe as possible and which requires only a minimum number of special parts enabling the limit gage to be incorporated in mass produced lathes at a cost consistent with marketing it as a part of the basic lathe.

It is a further object of the present invention to provide a thread stop or limit gage which can be incorporated in the cross slide hand wheel mechanisms of many, if not most, of the conventional lathes by relatively few drilling operations and one tapping operation thereby adapting the thread stop for incorporation in lathes without the need of expensive retooling costs and for ready inclusion on existing lathes at small cost.

It is another object of this invention to provide an improved thread stop or limit gage having simplified and inexpensive construction.

It is a still further object of this invention to provide a novel thread stop or limit gage which is readily adjustable into or out of operating position and the internal function of which cannot be interfered with by the lathe operator.

Other objects of the invention will be apparent from the claims and the description as it proceeds in connection with the drawings wherein:

Figure 1 is a view in section taken along the cross feed screw of the lathe showing the cross slide partially in section and supporting a compound rest and tool post in conventional manner;

Figure 2 is a sectional view of the cross slide hand wheel mechanism of Figure 1 illustrating the thread stop or limit gage of this invention assembled therein;

Figure 3 is a view taken along lines 3—3 of Figure 2;

Figure 4 is a view in half section of an index cam nut used in the thread stop or limit gage of this invention;

Figure 5 is an end view of the nut of Figure 4;

Figure 6 is an enlarged front view of the index cam and shaft assembly of this invention;

Figure 7 is an enlarged view in partial section of the index cam and shaft assembly as seen along lines 7—7 of Figure 6;

Figure 8 is an end view of an eccentric thumb knob employed in the threaded stop or limit gage; and Figure 9 is a sectional view taken along lines 9—9 of Figure 1 illustrating the operation of the thread stop or limit gage.

Referring now to the drawings wherein each part has been identified throughout with the same reference numeral, there is illustrated in Figure 1 a fragmentary view of carriage 10 mounted on lathe bed V ways 12 for longitudinal sliding movement along the lathe bed in usual manner. Cross feed screw 14 is journalled in bearings 16 of saddle 17 of carriage 10 and a support bracket 19 bolted to the front face of saddle 17 for rotational movement by means of cross feed hand wheel 18.

The top of saddle 17 is conventionally provided with dovetail ways (not shown) to slidably support cross slide 22. Cross feed nut 24 engages the threads of cross feed screw 14 and is axially movable along the threaded portion as feed screw 14 is rotated. Cross slide 22 is removably connected to nut 24 by means of a suitable headed machine screw 26.

Compound rest 27, made up of compound feed slide 28 and compound base 29, supports tool post or standard 30 for supporting the cutting tool (not shown). Compound rest 27 is conventionally mounted on cross slide 22 as by T-bolt 31 in an arcuate T-slot for pivotal movement on slide 22 which permits the position of the cutting tool transverse to the lathe bed to be controlled by means of cross feed hand wheel 18 and/or compound feed slide hand wheel 32, as well as by its customary power feed (not shown).

The improved thread stop or limit gage index cam, cam shaft and control lever of this invention is built into bracket 19 or other abutment element opposite cross feed hand wheel 18 and can be selectively moved into or out of operating position by simple axial bodily movement.

Referring now to Figure 2, bracket 19 and hand wheel 18 are shown in section. Bracket 19 contains the usual bore 40 and bearing bushings 42 through which the free end of cross feed screw 14 passes. Bracket 19 contains a pair of spaced ears 44 and 46, best shown in Figure 3, each having an aperture through which a screw is received for securing the flange to the front face of saddle 17 of carriage 10. Bracket 19 is a conventional part used on many lathes which are not provided initially with a thread stop or limit gage. In the present invention, it is modified only to the extent of providing it with a stepped drilled bore 48, a threaded section 50 and counterbore 52. This bore is preferably formed in the lower portion of the flange as assembled on the lathe.

Referring now also to Figures 4 and 5, an index cam support nut 54 formed with a threaded end 56 mates with threaded section 50 of bore 48. The other end of nut 54 is formed with a flanged section 58 having semicircular wrench receiving openings 60 and 62. A through bore 64 is formed along the axis of nut 54 to slidably receive the index cam and shaft assembly 67 which will now be described.

Referring to Figures 6 and 7, assembly 67 is made up of an index cam 68 formed with a pair of lobes 70 and 72 located at an angular relation with one another and a shaft 73. In the illustrated embodiment the opposite side edges of the lobes are parallel to each other and connected at their outer ends by a circular end section 71. The axes of the lobes make an angle of approximately 65° with each other. A through bore 74 is provided in index cam 68 to receive cam shaft 73. End portion 76 of cam shaft 73 has a reduced diameter which is slightly larger than bore 74 in index cam 68 to form a press fit when assembled. A small chamfer 78 may be provided if desired. The other end of shaft 73 includes a reduced diameter end section 75 terminating in shoulder 79 and having an annular snap ring groove 80 which extends symmetrically about the periphery of the shaft.

Referring now to Figures 1, 2 and 8 thumb knob 81 has its outer cylindrical surface 82 knurled and contains an axial bore 84 located at one side of its longitudinal axis. Thumb knob 81 fits freely on the reduced end 75 of shaft 73 and is held in position against shoulder 79 with a snap ring which fits in groove 80. Thumb knob 81 is free to pivot relative to shaft 73 to assure that the lathe operator does not rotate cam 73.

Referring now to Figures 1, 2 and 9, hand wheel 18 contains a centrally located bore 90 into which the free end of feed screw 14 is secured as by means of a key 91 in keyway 92 and nut 93 on the threaded free end of cross feed screw 14. An annular groove or recess symmetrical about the axis of the handwheel having an outer wall 94 and an inner wall 95 is formed in the face adjacent feed bracket 19. A projecting surface which may be in the form of a pin 96 is provided to extend from the bottom surface 98 of the recess. Pin 96 is preferably rigidly secured in a suitably formed hole located in surface 98 lying along the diameter which intersects the handle element of handwheel 18.

The improved thread stop or limit gage is assembled by first placing O-ring 99 in threaded aperture 50 of bracket 19 and nut 54 is loosely threaded into engagement with it. Index cam and camshaft assembly 67 is next inserted axially through the flanged face of nut 54 and O-ring 99 so that the end of shaft 73 containing snap ring groove 80 extends through bracket 19 and cam 68 lies adjacent end face 58 of receiving nut 54. A very small clearance is provided between the outside diameter of shaft 73 and the diameter of bore 64 of nut 54 so that the cam shaft will be accurately supported for both rotational and axial movement. To guard against inadvertent movement or rotation of cam shaft 73 due to vibration or like causes during normal operation of the equipment, nut 54, after insertion of assembly 67, is screwed down to compress O-ring 99 and cause the O-ring to frictionally, yet releasably, grip shaft 73. With bore 64 being formed with a 7/32 diameter drill, a diameter of .218 to .216 for the main body of cam shaft 73 has been found to provide a suitable free support. O-ring 99 also provides a seal for cam shaft 73 against dirt and foreign matter.

Thumb knob 81 is then assembled on the section 75 of shaft 73 and snap ring 88 placed in snap ring groove 80. Hand wheel 18 is then mounted on the end of feed screw 14 and secured in position by nut 94.

When thumb knob 81 is pushed away from the operator or to the left as shown in Figures 1 and 2 of the drawings, index cam 68 will be positioned out of the path of pin 96 and hand wheel 18 will be free to turn just as if the thread stop or limit gage were not present. When it is desired to utilize the thread stop or limit gage, hand wheel 18 is rotated clockwise to roughly position the tool near the work and thumb knob 81 is moved toward the operator so that index cam 68 lies in the path of pin 96 as hand wheel 18 is rotated. Hand wheel 18 is then further rotated clockwise to engage pin 96 with lobe 70 of cam 68 and to move cam 68 until lobe 72 engages wall 94. If further movement of the tool is required, hand wheel 32 is rotated to bring the tool against the work thus determining the initial tool setting. Thereafter handwheel 18 can be rotated in the opposite direction to back off the tool and permit the carriage to be moved to a starting point for an initial cut at which the tool can be returned to the initial tool seting by rotating handwheel 18 in its in-feed direction until stopped by cam 68.

As most clearly shown in Figure 9, the path of pin 96 as hand wheel 18 is rotated as well inside of the position of the cam shaft 73 with only lobes 70 and 72 lying in the path thereof. Lobe 72 of index cam 68 is shown in solid lines with one edge against surface 94 of hand wheel 18. If hand wheel 18 is now turned counterclockwise, pin 96 will engage lobe 70 at the position illustrated in solid lines and upon continued counterclockwise rotation will position cam 68 in the dotted line position on its first revolution as it passes index cam 68. This leaves lobe 72 in a position as shown in dotted lines to be abutted by pin 96 at point 104 on its second revolution thus forcing lobe 70 against surface 94 to prevent further rotation of hand wheel 18 and determine the backed-off position. A similar action results with approximately two turns of hand wheel 18 in the opposite direction.

So long as index cam 68 remains in the path of pin 96, the rotation of hand wheel 18 will be limited to approximately two revolutions in either direction thus providing positive control of the distance, substantially greater than the depth of any conventional thread to be cut, the cross slide can be moved by handwheel 18 to and from the work at the beginning and end of a threading cut thereby assuring accurate repositioning of the tool so that the depth of the initial or next cut can be adjusted accurately by hand wheel 32. Thumb nut 81 is loosely mounted on cam shaft 73 and because of its eccentrically located hole does not turn as cam shaft 73 turns. Thus the lathe operator cannot rotate cam shaft 73 but is able to merely slide it back and forth to optionally place cam 68 into or out of operative position. This construction prevents undesired rotational movement of cam 68 due to external forces such as vibration or inadvertent action of the operator.

The simplified construction of this thread stop limit gage makes it possible for primarily conventional parts to be used in the construction of the lathe and requires only a relatively few simple drilling operations and a tapping operation to provide a partly threaded through aperture 48 in bracket 19 and a drilling operation to provide a hole for receiving pin 96 to be added to hand wheel 18. The additional parts required are shown greatly enlarged in Figures 4 through 8 and are all small and can be inexpensively made and quickly assembled thereby providing a thread stop or limit gage which can be incorporated in a lathe at a minimum cost, and at the same time providing an improved indexing thread stop mechanism.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A thread stop or limit gage for a lathe comprising in combination a hand wheel adapted to turn with the lathe cross feed screw, a flange like member adapted to be non-rotatably mounted in juxtaposition to said hand wheel, an aperture in said flange like member having an axis substantially parallel to and spaced radially from the axis of rotation of said hand wheel, a shaft mounted in said aperture for independent axial and rotational movement, a plate like cam having an irregular periphery mounted for rotation between two limit positions on said shaft at a position between said flange member and said hand wheel, a projecting member extending from said hand wheel toward said cam to contact an edge thereof in at least one selected axial position of said cam as the hand wheel is rotated, said cam being rotatable from one of said limit positions to the other by turning said hand wheel in one direction, and hand engaging means for sliding said shaft axially to optionally move said cam into and out of operating position.

2. A thread stop or limit gage as defined in claim 1 together with means mounting said hand engaging means on said shaft for free rotational movement with respect to said shaft.

3. A stop or limit gage comprising in combination a relatively fixed flange member having a through bore for journalling a free end of a feed screw, a hand wheel adapted to be secured to said feed screw adjacent said flange member, means defining an aperture in said flange member having an axis substantially parallel to the axis of said through bore, a shaft in said aperture mounted for both axial and rotative movement, manual means for moving said shaft in an axial direction, a plate-like cam mounted on said shaft, a projection on said hand wheel for contacting an edge of said cam only when the cam is in its position closest to said hand wheel, said cam being rotatable about the axis of said shaft between two stop positions by said projection and effective to stop the hand wheel after a predetermined number of turns of the hand wheel in either direction.

4. A stop or limit gage as defined in claim 3 together with a nut threadedly received in said aperture having a through bore serving as a bushing for said shaft.

5. A stop or limit gage as defined in claim 4 wherein said nut extends only part way through said aperture and deformable gasket means is provided at the interior end of the nut to be deformed into frictional engagement annularly of said shaft to obviate axial and/or rotational movement of said shaft and its cam due to vibration or like causes.

6. A stop or limit gage as defined in claim 3 wherein said manual means for moving said shaft is mounted for independent free rotational movement with respect to said shaft.

7. A stop or limit gage comprising in combination a hand wheel, a flange like member adapted to be non-rotatably mounted in juxtaposition to said hand wheel, said member having a through aperture, a nut threadedly received in said aperture, a through bore in said nut, a shaft journalled in said through bore having a plate-like cam member rigidly secured on one end of said shaft, a projecting surface on said hand wheel for contacting an edge of said cam in at least one selected axial position of said cam and shaft and causing rotation of the cam about the axis of said shaft, said cam having a pair of lobes angularly related to pass said projecting surface during an intermediate rocking movement of said cam and engage the exterior edges of said respective lobes at opposite limits of said movement, means defining the limit position of cam rotation cooperating with one lobe when the projecting surface abuts against the other lobe thereby providing limited movement of the hand wheel in either direction, and manual means removably secured to the other end of said shaft for sliding said shaft and cam axially to optionally move said cam into and out of operating position.

8. A stop assembly comprising a hand wheel, an index cam support nut adapted for threaded engagement in a through bore in a relatively stationary member and having a bore therethrough, an index cam and shaft assembly adapted to slidingly and rotatably fit said through bore of said nut, an actuating member mounted for free rotational movement on the shaft of said index cam and shaft assembly in axially spaced relation from said cam at the end of said shaft protruding through said nut, a deformable ring engageable between said nut and a portion of the through bore into which it threads so as to be deformed into frictional engagement with said shaft to retain said index cam and shaft assembly against unintentional movement from its adjusted operative or inoperative position and a camming pin adapted to be secured in said handwheel for movement in a path to engage said cam upon selective axial movement of said index cam and shaft assembly to operative position adjacent said handwheel.

9. A stop assembly for limiting rotational movement of a handwheel comprising means defining an annular recess in said handwheel, said recess being bounded on one side by a cylindrical surface concentric with the axis of rotation of said handwheel, a stop member mounted in said handwheel and projecting into said recess, and a cam positioned in said recess and mounted for rotation about an axis parallel with the axis of rotation of said handwheel in a relatively fixed member, said cam having angularly related surfaces, one of said surfaces being in engagement with said cylindrical surface when the other of said surfaces is engaged by said stop member in the rotation of said handwheel to thereby limit rotation of said handwheel.

References Cited in the file of this patent
UNITED STATES PATENTS

| | | |
|---|---|---|
| 789,660 | Keating | May 9, 1905 |
| 874,197 | Heym | Dec. 17, 1907 |
| 1,711,301 | Zwicky | Apr. 30, 1929 |
| 1,799,311 | Moore | Apr. 7, 1931 |
| 2,131,129 | Whitehead | Sept. 27, 1938 |
| 2,330,354 | Hepburn | Sept. 28, 1943 |
| 2,775,043 | Suter et al. | Dec. 25, 1956 |

FOREIGN PATENTS

| | | |
|---|---|---|
| 175,163 | Germany | May 23, 1905 |